(12) United States Patent
Kim et al.

(10) Patent No.: US 6,573,476 B2
(45) Date of Patent: Jun. 3, 2003

(54) FLUX CORED WIRE FOR GAS-SHIELDED ARC WELDING

(75) Inventors: Jongwon Kim, Changwon (KR); Chulgyu Park, Changwon (KR)

(73) Assignee: Kiswel, Ltd., Kyoungnam (KR)

( * ) Notice: Subject to any disclaimer, the term of this patent is extended or adjusted under 35 U.S.C. 154(b) by 22 days.

(21) Appl. No.: 09/960,369

(22) Filed: Sep. 24, 2001

(65) Prior Publication Data

US 2002/0060212 A1 May 23, 2002

(30) Foreign Application Priority Data

Sep. 23, 2000 (KR) ........................................ 2000-56033

(51) Int. Cl.$^7$ .............................................. B23K 35/34
(52) U.S. Cl. ................................ 219/145.22; 219/146.1
(58) Field of Search ........................ 219/145.22, 146.1; 148/22, 23

(56) References Cited

U.S. PATENT DOCUMENTS

| | | | |
|---|---|---|---|
| 4,366,364 A | * 12/1982 | Arai et al. | 219/146.24 |
| 4,465,921 A | * 8/1984 | Sakai et al. | 219/146.24 |
| 5,233,160 A | * 8/1993 | Gordish et al. | 219/137 WM |

FOREIGN PATENT DOCUMENTS

| | | | | |
|---|---|---|---|---|
| JP | 63-183795 | * | 7/1988 | ......... B23K/35/368 |
| JP | 1-284497 | * | 11/1989 | ......... B23K/35/368 |

* cited by examiner

*Primary Examiner*—M. Alexandra Elve
(74) *Attorney, Agent, or Firm*—Bacon & Thomas, PLLC

(57) ABSTRACT

The flux cored wire comprises, with respect to the total weight of the wire, a Ti and a Ti oxide of 3.0 wt % to 8.0 wt % as calculated in terms of $TiO_2$ content, a Si and a Si oxide of 0.5 wt % to 2.0 wt % as calculated in terms of $SiO_2$ content, a metal Mn and an alloy of Mn of 1.5 wt % to 3.5 wt % as calculated in terms of Mn content, a carbon (C) of 0.02 wt % to 0.10 wt %, an Mg and an Mg oxide of 0.5 wt % to 1.5 wt % as calculated in terms of MgO content, a compound of $Na_2O$ and $K_2O$ of 0.2 wt % and less, a Zr and a Zr oxide of 0.1 wt % to 0.5 wt % as calculated in terms of $ZrO_2$ content, and an Al and an Al oxide of 0.2 wt % to 0.8 wt % as calculated in terms of $Al_2O_3$ content.

1 Claim, No Drawings

FLUX CORED WIRE FOR GAS-SHIELDED ARC WELDING

BACKGROUND OF THE INVENTION

1. Field of the Invention

The present invention relates to a flux cored wire, and more particularly to a flux cored wire for gas-shielded arc welding, made of metal such as titanium(Ti), silicon(Si) a magnesium(Mg) potassium(K), sodium(Na) or oxide thereof, in which a flux satisfying a specific component relationship of $K_2O$, $Na_2O$ and $SiO_2$ is filled in a metal sheath, and having a superior wearability in the welding of a mild steel and a high tensile strength steel.

2. Discussion of the Related Art

Generally, arc welding mainly used in welding metal applies a power of a low voltage and a high current between a welding material (i.e., an electrode or a filler metal) and a base metal to thereby generate an arc heat. The generated arc heat allows both of the welding material and the base metal to be melted and welded to each other. Arc welding is largely classified into two ways. One is a consumable electrode type arc welding and employs an filler metal as an electrode. In the consumable electrode type arc welding, filler metal and a base metal are both melted by arc heat generated between the base metal and the welding electrode to form a bead at a welding point. There are a shielded metal arc welding coated electrode arc welding, a submerged arc welding, and a metal active gas arc welding and metal innert gas arc welding as kinds of the arc welding.

The other is a non-consumable electrode type arc welding. In the non-consumable electrode type arc welding, the electrode functions only to generate an arc. Therefore, to obtain a welding metal, a filler metal should be added within an occurrence range of an arc and be melted. There are a TIG (Tungsten Inert Gas) welding and an atomic hydrogen welding as kinds of the electrode-non-molten type arc welding.

The remaining arc welding methods except the shielded metal arc welding supply an inert gas or carbon dioxide gas around a molten pool where a liquid metal molten by arc heat during welding is formed to prevent oxidation of the molten pool or control an atmosphere of a melted metal, and shield a contact of the melted metal with air. To this end, they are called as gas-shielded arc welding.

Gas-shielded arc welding is largely classified into two ways, one using an inert gas like MIG(Metal Inert Gas) or TIG welding and the other using carbon dioxide gas which is cheap in cost. For these two welding methods, solid wire and flux wire are used as welding material.

When the welding material is not used for a specific purpose, it has preferably a bead shape. In these days, due to the coatability and removability of slag and a fast rate of deposition, the flux cored wire is increasingly used.

The flux cored wire is used as a welding material for the gas-shileded arc welding having a high efficiency in the fields of automobile, shipbuilding, architecture, etc. The flux cored wire includes a metal sheath and a flux filled in the metal sheath. Since the flux cored wire has a superior workability and stability for welding, it has advantages in that an occurrence amount of spatter is small and a uniform bead is obtained.

For high efficiency of the gas-shielded arc welding, it may be required to increase the welding speed by 50% or more in a downward or a horizontal fillet welding. To obtain such a target welding speed, a grain distribution of main composition in the flux cored wire is controlled or a composition ratio of a slag forming agent is controlled.

However, these trials show only improved appearance of the bead rather than increase in the welding speed.

As one method for increasing the welding speed, there is a method using plural welding electrodes. This method, however, makes the welding instrument and peripheral instrument complicated, and thereby it has a drawback in that an investment cost for the welding instrument increases.

SUMMARY OF THE INVENTION

Accordingly, an object of the present invention is to solve at least the problems and disadvantages of the related art.

An object of the present invention is to provide a flux cored wire for gas-shielded arc welding having a superior welding capability in all welding position, especially a convenience in the vertical upward welding, and a superior bead shape, and simultaneously making it possible to perform a horizontal fillet welding in a high speed.

Additional features and advantages of the invention will be set forth in part in the description which follows and in part will become apparent to those having ordinary skill in the art upon examination of the followings or may be learned from practice of the invention. The objectives and other advantages of the invention will be realized and attained as particularly pointed out in the appended claims.

To achieve the object and in accordance with the purpose of the present invention, as embodied and broadly described, a flux cored wire for gas-shielded arc welding comprises a Ti and a Ti oxide of 3.0 wt % to 8.0 wt % as calculated in terms of $TiO_2$ content, a Si and a Si oxide of 0.5 wt % to 2.0 wt % as calculated in terms of $SiO_2$ content, a metal Mn and an alloy of Mn of 1.5 wt % to 3.5 wt % as calculated in terms of Mn content, a carbon(C) of 0.02 wt % to 0.10 wt %, an Mg and an Mg oxide of 0.5 wt % to 1.5 wt % as calculated in terms of MgO content, a compound of $Na_2O$ and $K_2O$ of 0.2 wt % and less, a Zr and a Zr oxide of 0.1 wt % to 0.5 wt % as calculated in terms of $ZrO_2$ content, and an Al and an Al oxide of 0.2 wt % to 0.8 wt % as calculated in terms of $Al_2O_3$ content, wherein the composition ratio of the above described components is defined with respect to a total weight including a metal sheath which is a crust and satisfies the following formulas (1) and (2).

$$0.1 \le \frac{2K_2O + Na_2O}{SiO_2} \le 0.3 \quad \text{Formula (1)}$$

$$1.6 \le \frac{FeO + MnO + MgO}{SiO_2 + Al_2O_3 + 0.4TiO_2} \le 2.1 \quad \text{Formula (2)}$$

It is to be understood that both the foregoing general description and the following detailed description are exemplary and explanatory and are intended to provide further explanation of the invention as claimed.

The aforementioned contents of the components affect on the welding as follows.

Titanium (Ti) is added in a form of a metal Ti and a Ti oxide. If Ti is added in the form of metal powder or iron alloy, it acts as a strong deoxidizer to thereby form a $TiO_2$. The formed $TiO_2$ acts as an agent for forming a slag to thereby improve the coatability of the bead. While if Ti is added in the form of a Ti oxide, it acts as an agent for forming a slag to improve the coatability of the bead and simultaneously control the shape of the bead. To this end, when a content of Ti as calculated in terms of $TiO_2$ content is less than 3.0 wt %, it lacks in a created amount of the slag and thereby not only the slag coatability in a high speed welding using the downward and horizontal fillet is degenerated but a failure in the bead shape occurs. Also, the Ti amount of less than 3.0 wt % generates a drooping of the bead in a welding of the vertical upward position while when a content of Ti is greater than 8.0 wt %, a fusion capability of the bead in a welding of the horizontal fillet position is lowered.

Silicon (Si) which is added alone or in a form of a compound accelerates not only deoxidation of a deposited metal but it acts as an agent for forming a slag. Also, Si renders the slag to have a proper fluidity. To this end, when a content of Si as calculated in terms of $SiO_2$ content is less than 0.5 wt %, not only the fluidity of the slag is lowered but a defect such as a blow hole occurs at the welding zone while, when a content of Si is greater than 2.0 wt %, a low temperature characteristic of a deposited metal is lowered.

Manganese (Mn) is a deoxidizer of a deposited metal and it not only restrains an occurrence of a blow hole and a pit which are representative welding defect but enhances a mechanical strength and toughness of a welding zone. To this end, when a content of Mn is less than 1.5 wt %, a functionality as the deoxidizer is lowered and an enhancement effect in the strength and toughness of the welding zone is lowered while, when a content of Mn is greater than 3.5 wt %, an appearance of the bead is degenerated due to the overdeoxidation of a deposited metal.

Carbon(C) is added to a metal sheath to enhance the strength of a welding metal. When a content of C is less than 0.02 wt %, such an enhancement effect in the strength of a welding metal scarcely occurs while, when a content of C is greater than 0.10 wt %, a spatter and fume occurrence increases to thereby lower the welding workability.

Magnesium (Mg) is used as a strong deoxidizer together with aluminum (Al) and titanium (Ti) and magnesium monoxide (MgO) is used as an agent for forming a slag. To this end, when a content of Mg as calculated in terms of MgO content is greater than 1.5 wt %, the coatability of the slag with respect to the welding bead is lowered and thereby an appearance thereof is degenerated while when a content of Mg is less than 0.5 wt %, the deoxidizing function and the drooping preventive function disappear.

Zirconium (Zr) is mainly added in a compound of Fe—Zr or a Zr sand. $ZrO_2$ which is created during the welding, especially during the horizontal fillet welding enhances the bead-fusion capability. However, when a content of Zr as calculated in terms of $ZrO_2$ content is less than 0.1 wt %, such an enhancement effect in the fusion capability is very small while when a content of Mg is greater than 0.5 wt %, a shape of the welding bead is failed during the horizontal fillet welding.

Aluminum(Al) is a representative deoxidizer and helps a deoxidization of a molten metal. $Al_2O_3$ created by a deoxidation reaction elevates a solidification point of the slag and thereby it restrains the drooping of the bead in a welding of the vertical upward welding position and improves a shape of the bead. However, when a content of Al as calculated in terms of $Al_2O_3$ content is less than 0.2 wt %, such an effect is very small while when a content of Al is greater than 0.8 wt %, an appearance of the bead is failed during the horizontal fillet welding.

And, as aforementioned, $SiO_2$ is an agent for forming a slag and controls a shape of the bead through a control of the slag coatability and the viscosity. $K_2O$ and $Na_2O$ lower the melting point of the slag to thereby improve the fluidity of the slag and stabilize arc. However, when a value of the formula (1) is less than 0.1, the stabilizing effect scarcely occurs while the value is greater than 0.3, the melting point of the slag during the welding is lowered and thereby a drooping phenomenon of the bead in the welding of the vertical upward position is apt to occur and an occurrence of the welding fume increases.

Using a flux having the aforementioned composition range and a metal sheath of KS D 3512 SPCC standard, a sample of a flux cored wire for a gas-shielded arc welding having a diameter of 1.4 mm in accordance with the present invention is fabricated and a comparative go sample in accordance with the conventional art is also fabricated for the comparison with the flux cored wire of the present invention. For the comparison between the two examples, performance and welding workability are measured and a welding condition and compositions are shown in Tables 1 and 2.

TABLE 1

| Item | Welding Condition | |
|---|---|---|
| Welding zone | Horizontal fillet | Vertical upward |
| Kind of base metal | KS D 3515 SM490A | |
| Thickness of base metal | 12 mm | |
| Welding voltage | 38 V | 26 V |
| Welding current | 380 A | 240 A |
| Welding speed | 100 cm/min | — |
| Shield gas | 100% $CO_2$ | |
| Supply amount of gas | 20 l/min | |

TABLE 2

| | Chemical composition of flux cored wire (wt %) | | | | | | | |
|---|---|---|---|---|---|---|---|---|
| Item | $TiO_2$ | $SiO_2$ | MgO | $ZrO_2$ | $Al_2O_3$ | Mn | C | $K_2O$ + $Na_2O$ |
| Example | | | | | | | | |
| 1 | 6.0 | 1.5 | 1.0 | 0.2 | 0.6 | 3.0 | 0.04 | 0.16 |
| 2 | 5.8 | 1.2 | 1.0 | 0.2 | 0.4 | 3.0 | 0.04 | 0.16 |
| 3 | 6.2 | 1.2 | 0.8 | 0.2 | 0.4 | 3.0 | 0.04 | 0.14 |
| 4 | 6.0 | 1.0 | 0.8 | 0.2 | 0.6 | 3.0 | 0.03 | 0.16 |
| 5 | 6.2 | 1.4 | 0.8 | 0.2 | 0.6 | 3.0 | 0.03 | 0.16 |
| 6 | 6.0 | 1.4 | 0.8 | 0.2 | 0.4 | 2.5 | 0.03 | 0.14 |
| 7 | 5.0 | 1.5 | 1.0 | 0.2 | 0.4 | 2.5 | 0.03 | 0.18 |
| Comparative example | | | | | | | | |
| 8 | 6.0 | 2.4 | 1.0 | 0.6 | 0.4 | 2.5 | 0.03 | 0.14 |
| 9 | 2.5 | 1.5 | 1.0 | 0.2 | 0.4 | 2.5 | 0.03 | 0.14 |
| 10 | 6.2 | 1.5 | 2.0 | 0.2 | 0.6 | 3.0 | 0.04 | 0.14 |
| 11 | 6.0 | 1.4 | 0.8 | 0.2 | 0.0 | 3.0 | 0.04 | 0.12 |
| 12 | 6.2 | 1.4 | 0.8 | 0.2 | 0.4 | 4.0 | 0.04 | 0.14 |
| 13 | 6.0 | 1.4 | 0.8 | 0.2 | 0.6 | 3.0 | 0.03 | 0.24 |
| 14 | 5.0 | 1.5 | 1.0 | 0.0 | 0.6 | 3.0 | 0.03 | 0.14 |

Table 3 shows values of the formulas (1) and (2) for respective flux cored wires for welding.

TABLE 3

| | | Formula ratio of flux composition | |
|---|---|---|---|
| Item | | Value of formula (1) | Value of formula (2) |
| Example | 1 | 0.10 | 1.86 |
| | 2 | 0.13 | 2.00 |
| | 3 | 0.12 | 2.00 |
| | 4 | 0.16 | 2.16 |
| | 5 | 0.11 | 1.94 |
| | 6 | 0.10 | 1.80 |
| | 7 | 0.12 | 1.84 |
| Comparative example | 8 | 0.06 | 1.38 |
| | 9 | 0.09 | 2.66 |
| | 10 | 0.09 | 1.94 |
| | 11 | 0.09 | 2.02 |
| | 12 | 0.10 | 2.33 |
| | 13 | 0.17 | 1.97 |
| | 14 | 0.09 | 2.16 |

Table 4 and 5 show an evaluation result for the welding operation in the horizontal fillet and the vertical upward position under the above described welding conditions.

TABLE 4

Evaluation of welding workability (Horizontal fillet position)

| Item | | Arc stability | Occurrence amount of spatter | Detachability of slag | Bead shape |
|---|---|---|---|---|---|
| Example | 1 | ⊙ | ⊙ | ⊙ | ⊙ |
|  | 2 | ○ | ○ | ○ | ○ |
|  | 3 | ⊙ | ⊙ | ⊙ | ○ |
|  | 4 | ⊙ | ○ | ⊙ | ○ |
|  | 5 | ⊙ | ⊙ | ⊙ | ○ |
|  | 6 | ○ | ○ | ⊙ | ○ |
|  | 7 | ○ | ○ | ⊙ | ○ |
| Comparative example | 8 | △ | △ | ○ | △ |
|  | 9 | X | X | X | △ |
|  | 10 | △ | X | ○ | △ |
|  | 11 | ○ | △ | △ | △ |
|  | 12 | △ | △ | ○ | △ |
|  | 13 | ⊙ | ○ | ⊙ | △ |
|  | 14 | △ | △ | ○ | △ |

TABLE 5

Evaluation of welding workability (Vertical upward position)

| Item | | Arc stability | Occurrence amount of spatter | Detachability of slag | Bead shape |
|---|---|---|---|---|---|
| Example | 1 | ⊙ | ⊙ | ⊙ | ○ |
|  | 2 | ○ | ○ | ○ | ○ |
|  | 3 | ⊙ | ⊙ | ⊙ | ○ |
|  | 4 | ⊙ | ○ | ⊙ | ○ |
|  | 5 | ⊙ | ○ | ⊙ | ○ |
|  | 6 | ○ | ○ | ⊙ | ○ |
|  | 7 | ○ | ○ | ○ | ○ |
| Comparative example | 8 | △ | △ | ○ | X |
|  | 9 | X | X | X | △ |
|  | 10 | △ | X | ○ | △ |
|  | 11 | ○ | △ | △ | △ |
|  | 12 | △ | X | ○ | X |
|  | 13 | ⊙ | ○ | ○ | X |
|  | 14 | △ | △ | ○ | △ |

As shown Tables 4 and 5, the flux cored wires in accordance with the present show a good result both in the horizontal fillet position and the vertical upward position but the flux cored wires of the comparative example in accordance with the conventional art show a non-desired result.

Hereinafter, a welding result of the flux cored wires of the conventional art is analyzed and described based on the composition range of the present invention.

Comparative example No. 8 does not satisfy the amount of $SiO_2$ and the formulas (1) and (2) and thereby a failure in the bead shape occurs. Especially, a drooping phenomenon of a melted metal occurs in the vertical upward position welding.

Comparative example No. 9 is lack of an amount of $TiO_2$ and thereby not only arc is unstable but an occurrence amount of spatter is large and the coatability of slag is not good.

Comparative example No. 10 exceeds a proposal range in the amount of the MgO and has an unsatisfied flux combination ratio. Therefore, the comparative example No. 10 is large in an occurrence amount of spatter.

Comparative example No. 11 scarcely contains an amount of $Al_2O_3$. To this end, it is not easy to control a solidification point of the slag and a bead shape is not satisfactory in the welding of the horizontal fillet and the vertical upward position.

Comparative example No. 12 to No. 14 exceed a proposal range respectively in the amount of $K_2O+Na_2O$ and $ZrO_2$. As a result, they are low in the arc stability, large in the occurrence amount of spatter, and large in the occurrence amount of fume, and are not preferable in terms of the welding workability.

As described previously, a flux cored wire for the gas-shielded arc welding in accordance with the present invention controls an amount ratio of respective components as well as a flux composition, thereby making it possible to perform a welding operation in a high speed faster than ever.

Moreover, the flux cored wire of the present invention prevents a drooping phenomenon in the horizontal fillet position and the vertical upward position, thereby minimizing a correction work after completing the welding work and enhancing the efficiency of the welding work and the stability.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A flux cored wire for gas-shielded arc welding comprising, with respect to the total weight of the wire, a Ti and a Ti oxide of 3.0 wt % to 8.0 wt % as calculated in terms of $TiO_2$ content, a Si and a Si oxide of 0.5 wt % to 2.0 wt % as calculated in terms of $SiO_2$ content, a metal Mn and an alloy of Mn of 1.5 wt % to 3.5 wt % as calculated in terms of Mn content, a carbon(C) of 0.02 wt % to 0.10 wt %, an Mg and an Mg oxide of 0.5 wt % to 1.5 wt % as calculated in terms of MgO content, a compound of $Na_2O$ and $K_2O$ of 0.2 wt % and less, a Zr and a Zr oxide of 0.1 wt % to 0.5 wt % as calculated in terms of $ZrO_2$ content, and an Al and an Al oxide of 0.2 wt % to 0.8 wt % as calculated in terms of $Al_2O_3$ content, wherein the composition ratio of the components satisfies the following formulas (1) and (2):

$$0.1 \leq \frac{2K_2O + Na_2O}{SiO_2} \leq 0.3 \quad \text{Formula (1)}$$

$$0.6 \leq \frac{FeO + MnO + MgO}{SiO_2 + Al_2O_3 + 0.4TiO_2} \leq 2.1. \quad \text{Formula (2)}$$

* * * * *